United States Patent Office 3,540,855
Patented Nov. 17, 1970

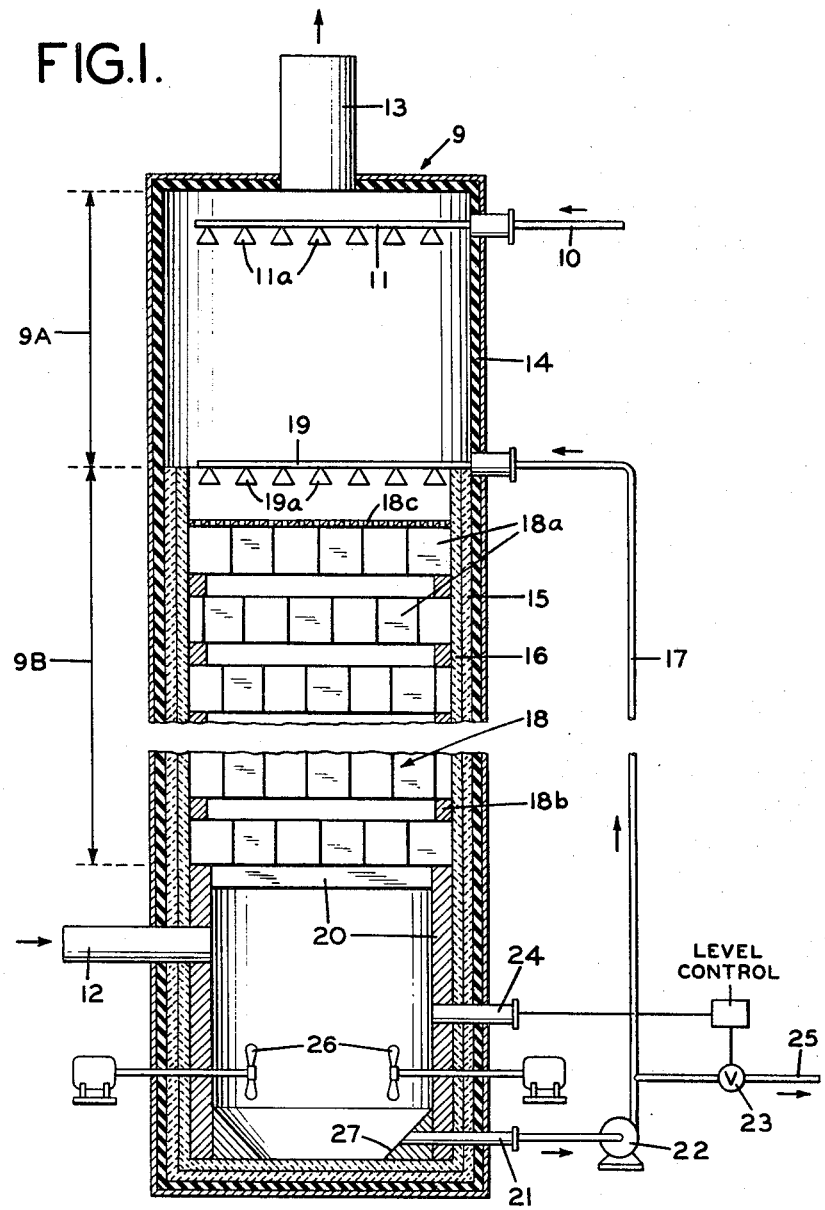

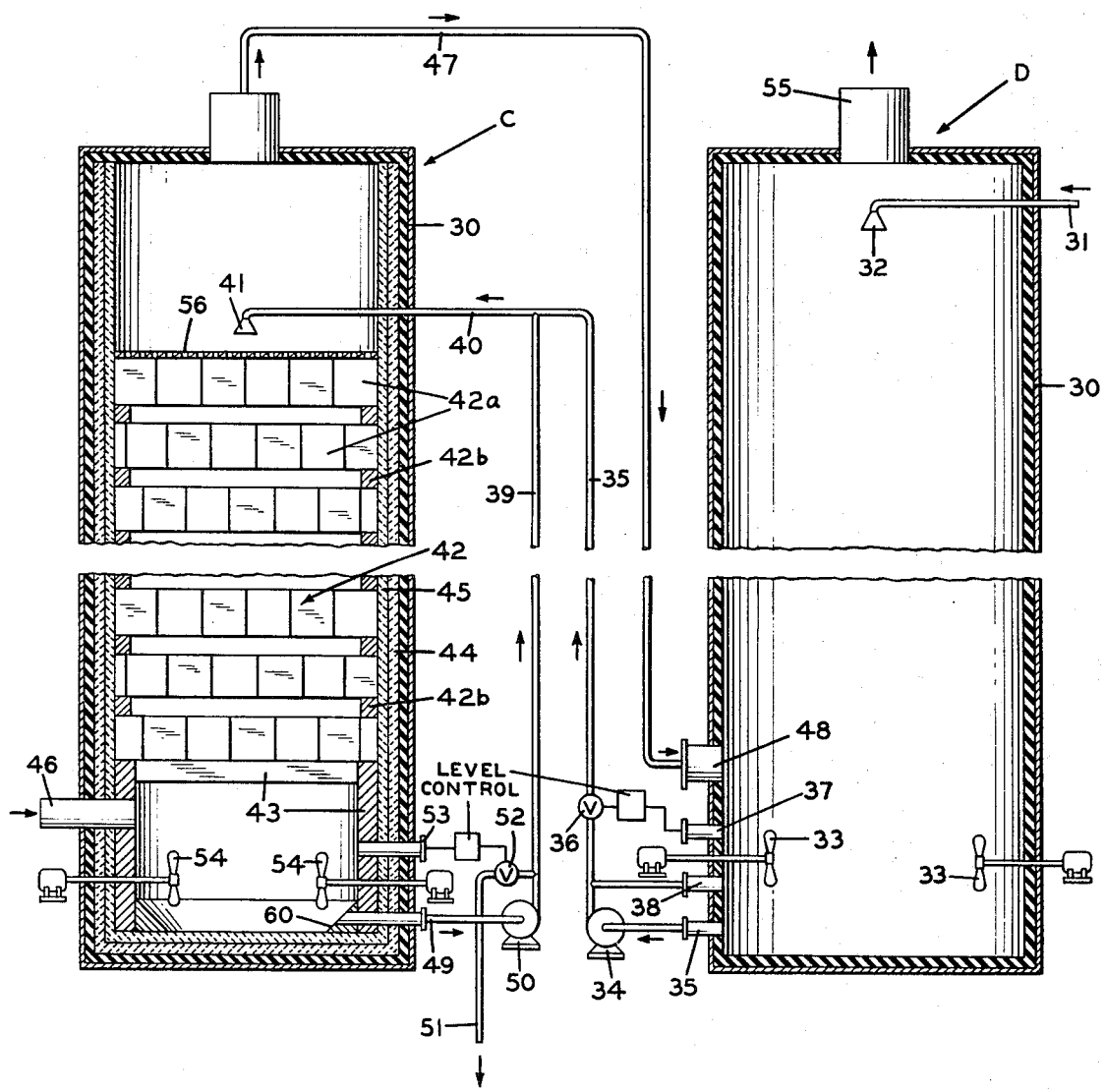

3,540,855
APPARATUS FOR ACIDULATING PHOSPHATE ROCK WITH GASEOUS HYDROGEN CHLORIDE
William P. Moore, Chester, Rob R. MacGregor, Hopewell, and Richard E. Ogden, Petersburg, Va., assignors to Allied Chemical Corporation, New York, N.Y., a corporation of New York
Filed July 10, 1967, Ser. No. 652,054
Int. Cl. B01j 1/00, 1/20; C01b 25/18
U.S. Cl. 23—283         3 Claims

ABSTRACT OF THE DISCLOSURE

An apparatus particularly useful for absorbing gaseous hydrogen chloride in an aqueous phosphate rock slurry and reacting the absorbed hydrogen chloride with the phosphate rock to produce phosphoric acid. The apparatus includes a spray section, spray means in said spray section, a packed section, and an agitated reservoir or base section for completion of the reaction. The slurry is recycled from the base section through the packed section for further absorption of hydrogen chloride. The packed section contains an open grid-type packing having at least 75% open area to avoid plugging of the apparatus with the slurry.

BACKGROUND OF THE INVENTION

This invention relates to an efficient process and apparatus for the acidulation of phosphate rock with gaseous hydrogen chloride. More specifically, it relates to a process and a tower-type contactor apparatus for the continuous counter-current contacting of an aqueous slurry of phosphate rock with a gaseous stream containing hydrochloric acid.

No prior art is known that utilizes the apparatus of the present invention. Bingeman and Reynolds (Chem. Eng. Prog. 56, 67 (1960)) describe the use of falling film absorbers together with a packed tower for recovery of HCl from inert gases. This equipment is suitable for clear solutions but is subject to plugging and erratic flow when used with slurries. Thus, it is not suitable for acidulation of an aqueous slurry of phosphate rock.

According to Chemical Abstracts 53, 22776, Japanese Pat. 10,781 describes a process wherein waste gas containing HCl or other mineral acid is contacted with a spray of an aqueous suspension of powdered phosphate rock. This process has several disadvantages, e.g., the contact time in spray towers is minimal and necessitates very large equipment.

RELATED APPLICATIONS

This application is related to U.S. application Ser. No. 609,107, filed Jan. 13, 1967, now U.S. Pat. 3,441,375, issued Apr. 29, 1969, which describes a process for production of phosphoric acid from phosphate rock and a hydrogen chloride-containing gas.

It is one object of the present invention to produce phosphoric acid by a simple and efficient process from a hydrochloric acid-containing gas and an aqueous slurry of phosphate rock.

It is another object of the present invention to develop an efficient apparatus for absorbing gaseous acid in an aqueous slurry.

It is a further object of the present invention to produce phosphoric acid from a hydrochloric acid-containing gas and an aqueous slurry of phosphate rock in a two-stage apparatus having a packed section and a spray section.

SUMMARY OF THE INVENTION

In accordance with the present invention of producing phosphoric acid, a gas containing less than 10% hydrogen chloride is passed countercurrently through a packed section to an aqueous slurry containing 10–50% of phosphate rock which is fed through a packed section maintained at 85–110° C. The gas exiting from the packed section is then fed in countercurrent contact with a spray of the aqueous slurry of phosphate rock in a spray section which is maintained at 85–110° C. such that at least 96% of the hydrogen chloride is absorbed in the aqueous slurry to form 5–15% phosphoric acid and 100% of the $P_2O_5$ is converted to water-soluble $P_2O_5$.

An apparatus for the absorption of a gaseous acid into a slurry includes a spray section, spray means in said first section, a falling film packed section, and an open grid-type packing in said packed section having at least 75% open area of the total packing cross-sectional area such that at least 60% of the acid is absorbed in the packed section and at least 96% of the acid is absorbed in the slurry in both sections.

DESCRIPTION OF THE DRAWINGS

FIG. 1 is a partial sectional and schematic view of a single tower apparatus illustrative of a preferred embodiment of the invention; and FIG. 2 is a partial sectional and schematic view of a two tower apparatus illustrative of another embodiment of the invention.

PREFERRED EMBODIMENT OF THE INVENTION

With reference to FIG. 1, a tower 9 is provided with an upper spray section 9A and a lower packed section 9B. Aqueous slurry of phosphate rock is transported through line 10 near the top of tower 9 and passed through a liquid distribution system 11 made of non-metallic material, such as Haveg, and includes a plurality of full cone spray nozzles 11a for distribution of the slurry in upper spray section 9A. Hydrogen chloride-containing gas passes through line 12 at the base of tower 9 below packed section 9B, the spent gas being removed at the top of the tower through line 13.

The shell tower is made of a suitable material such as carbon steel lined with hard rubber 14 with the sides and bottoms lined with a layer of acid resistant brick 15 and a layer of carbon brick 16. The brick linings 15 and 16 extend upwardly along the tower to a point at which recirculating product slurry is sprayed onto packed section 9B via a non-metallic distributing system 19 having a plurality of nozzles 19a connected to recirculating line 17. A packing, generally referred to as 18, is supported on a base 20 and consists of a series of layers of misaligned open grids 18a, each grid layer resting on supporting elements 18b. The packing is made of an inert material and is described in more detail hereinafter. A grate 18c is provided on top of packing 18 to equalize the flow of slurry passing therethrough to the packing. The upper spray section 9A need not be lined with bricks 15 and 16, respectively, as the lower packed section, since operating temperatures are relatively lower in the upper spray section. It also has been found that in the event inlet gas temperatures are below about 100° C., the bricks 15 and 16, respectively, can be eliminated in the lower packed section 9B.

The type of packing used in the packed section of the contactor is important because use of conventional packing materials results in plugging difficulties due to the solids in the slurry being processed. Packing used in the apparatus should have the following characteristics: (1) Open construction to avoid plugging or fouling; (2) Deterioration resistance in presence of acids and slurries; (3) Freedom of channeling of either gas or liquid; (4) Adequate strength; and (5) Low pressure drop. In addition, for practical reasons, the packing should be of relatively low cost and capable of easy installation.

We have found that the best packing for use in the present apparatus consists of a series of misaligned layers of square gridworks 18a having vertical ribs spaced about 2 inches apart in both directions and similar in appearance to the grids used in an egg crate. Each gridwork is made from an inert material, preferably, polystyrene or polyethylene. When installed in the tower, each layer of gridwork is misaligned with the layers of gridwork disposed directly above and below it, spacers 18b being provided to hold the gridwork about 1 to 2 inches apart from each other. It was found that a limited vertical spacing between grids could be used without decreasing the transfer coefficient. The minimum aqueous slurry loading for completely wetting the packing surface is about 300 pounds/(hour) (square foot).

It has been found that usage of the grid-type packing as described above results in suitable absorption capacity and is not susceptible to plugging with solids, the grid-type packing having 75% or more open area. Adjustment of the packing height to give 60–90% of the HCl absorption in this zone minimizes the height of spray tower section required. Some absorption must occur in the spray tower section to permit $CO_2$ evolution in an area free of packing where flooding is no problem.

The upper spray section of the tower can operate at very low liquid to gas ratios and the use of single pass flow on the aqueous slurry stream provides maximum driving force for removing HCl from the gas stream. The lower packed section must operate at higher liquid to gas ratios in order to wet the packing and obtain bulk HCl removal with low tower heights. Recirculation of a major portion of the product slurry provides the liquid for wetting the packing while still maintaining high $P_2O_5$ conversions.

Product slurry is removed at the base of the tower through line 21 by means of pump 22 which is made of a suitable non-metallic material such as Hypalon. A level of liquid is maintained at the base of the tower to provide additional reaction time and to provide a reservoir of liquid for circulation through the packed section 9B. A level control valve 23 which receives a signal from port 24 at the base of the tower regulates the flow of product slurry through line 25. A sloped base 27 is provided at the bottom of the tower to facilitate drainage of the slurry to pump 22, the base being provided with agitators 26 to assure a maintenance of the solids in suspension.

FIG. 2 is another embodiment of the apparatus of the present invention wherein the lower packed section 9B and the upper spray section 9A, shown in the tower of FIG. 1, may be separated into two towers, C and D respectively. The spray tower D is a carbon steel shell lined with hard rubber 30. Aqueous slurry of phosphate rock is transported through line 31 to the top of tower D and sprayed through full cone nozzle 32. Agitators 33 are provided to assure maintenance of the solids in suspension. A pump 34 is used to pump the slurry from tower D through line 35 into the upper part of the packed tower C. A level control valve 36 which operates in response to a signal from port 37 controls the level of flow through line 35. Excess slurry from tower D is returned to the bottom of the tower through line 38. The slurry flowing through line 35 merges with product slurry flowing through line 39, the merged slurries flowing through line 40 and exiting from full cone nozzle 41. The slurry passes through a grate 56 for equalizing flow thereof onto the packing 42. The packing 42 is similar to the packing 18 of FIG. 1 and consists of a plurality of misaligned layers of grids 42a, each resting on supporting elements 42b and all of which rests on support 43.

The packed tower C is of carbon steel lined with hard rubber 30 with the sides and bottoms lined with a layer of acid resistant brick 44 and a layer of carbon brick 45. Hydrogen chloride-containing gas enters at the base of tower C through line 46 below the packing whereupon it flows upwardly through the packing 18 and exits through line 47 onto port 48 of tower D. The spent gas finally exits from tower D through line 55.

Product slurry is pumped from line 49 by pump 50 through line 39. Part of the product slurry containing phosphoric acid is taken out from line 39 through line 51. The rate of flow in line 51 is controlled by a level control valve 52 which operates in response to a signal from port 53 such that a sufficient level of slurry is maintained at the base of tower C. The base of tower C is sloped at 60 to facilitate drainage of the slurry to pump 50. Agitators 54 may be provided to assure a maintenance of the solids in suspension.

In a preferred process, the phosphate rock utilized in the slurry is ground so that about 80% of the particles have a size below 50 U.S. mesh. Generally 10–50% and preferably 20–40% phosphate rock is in the aqueous slurry. The aqueous slurry is fed through the top of a packed section so that the aqueous slurry travels to the bottom of the packing in the form of a film. A gas containing generally less than 10% and preferably 2–8% hydrochloric acid is passed upwards through the packing, generally maintained at 85–110° C. and preferably 95–105° C., at atmospheric pressure to effect rapid reaction between the phosphate rock and hydrochloric acid and also to minimize the condensation of water within the reaction chamber. The hydrogen chloride absorbs into the slurry, thereby directly and effectively reacting with the calcined or uncalcined phosphate rock to produce phosphoric acid. Generally at least 60% of the hydrochloric acid, preferably 60–90%, is absorbed into the aqueous slurry to form phosphoric acid. The gas exiting from the packed section is then passed upwardly through a spray section in which the aqueous slurry is sprayed downwardly in countercurrent contact with the gas exiting from the packed section. In this manner, there is obtained an aqueous reaction product containing generally 5–15% and preferably 8–10% of phosphoric acid together with by-product calcium chloride and minor amounts of solid matter. Furthermore, generally at least 90% and preferably at least 96% of the hydrogen chloride in the gas is absorbed into the aqueous slurry while 100% of the $P_2O_5$ is converted into water soluble $P_2O_5$. All the percentages presented in the specification are by weight unless otherwise specified.

The absorption towers of this invention are capable of handling gas flow rates over 2,000 pounds per hour per square foot of tower cross section while absorbing over 95% of the HCl in the gas stream. Liquid retention times, as low as 0.3 of an hour, in the tower sump below the packed section are adequate. Generally, the liquid to gas weight ratio in the spray section may be as low as 0.3 and as low as 3 in the packed section.

The liquid to gas ratio in the spray section should generally range from about 0.2–3.0 and preferably 0.3–2.0, and in the packed section should generally range from 3.0–10.0 and preferably 3.0–8.0.

Obviously, it is desirable in the acidulation of the phosphate rock to use the HCl in gaseous form and avoid separate production of aqueous HCl prior to rock digestion. The use of an empty spray tower in accordance with prior art would require very large equipment because of the relatively low absorption capacity. Since a slurry of solids is being processed, the use of conventional packing materials would present plugging difficulties. Further, the evolution of $CO_2$ during the acidulation causes foam to be produced which may greatly decrease the packing efficiency and cause flooding.

The example given below is one illustration of the preferred embodiment of the invention. It is not intended to limit the invention in any way.

EXAMPLE I

The following example was carried out in apparatus similar to that shown in FIG. 2. The towers were 12-inch in diameter by 13-feet long sections of carbon steel pipe with an inner rubber lining which resulted in an effective cross sectional area of 0.74 square foot. The packed tower section contained 9 feet of Fluor Poly-Grid packing. This packing is a molded lattice of thin polypropylene slats 1 3/16 inches high and spaced on 2-inch centers. This arrangement provides square openings of about 2 inches. A liquid distribution plate of 3/8-polyvinyl chloride containing 173 holes which were 3/8 inch in diameter was placed at the top of the packing. Incoming gas was transported by a 4-inch diameter Fiberglas pipe to an inlet nozzle near the bottom of the packed tower section. The discharge gas left at the top of the packed tower section through a 4-inch Fiberglas pipe which transported the gas to an inlet nozzle near the bottom of the spray tower section.

The incoming phosphate rock slurry was sprayed through 1/4-inch nozzle at the top of the spray tower. Final discharge of the scrubbed gas was through a 4-inch Fiberglas pipe at the top of the spray tower. The partially reacted rock slurry was discharged from the bottom of the spray tower to a Hypalon-lined centrifugal pump. A part of this slurry was circulated around the piping at the base of the tower to keep solids in suspension and a liquid level was maintained with slurry draw-off from the discharge side of the pump. This slurry draw-off was pumped to the slurry recirculation line of the packed tower section.

The slurry in the packed tower section was continuously recirculated over the packing with a Hypalon-lined centrifugal pump. Part of this recirculating slurry, which may be called the product slurry or acidulate, was continuously withdrawn from the pool of acidulate at the base of the packed tower section.

The above equipment was used to contact 380 pounds per hour of a 36.8 weight percent slurry of phosphate rock with 971.2 pounds per hour of gas containing 7.6 volume percent HCl. The gas temperature was about 104° C. and the rock slurry temperature was about 25° C. Temperatures in the packed tower section and spray tower section were 104° and 103° C., respectively. The liquid to gas mass flow ratio was 0.4 in the spray tower section and 4.1 in the packed tower section.

Approximately 60% of the HCl absorption occurred in the packed tower section to give an overall HCl absorption efficiency of 96% with 100% $P_2O_5$ conversion to water-soluble $P_2O_5$.

Although certain preferred embodiments of the invention have been disclosed for purpose of illustration, it will be evident that various changes and modifications may be made therein without departing from the scope and spirit of the invention.

We claim:

1. An apparatus for producing phosphoric acid from an aqueous slurry of phosphate rock and a hydrogen chloride-containing gas comprising:
   (a) a vertical spray section having an outlet for spent gas and an inlet for introducing an aqueous slurry of phosphate rock, both located at the top portion of the spray section;
   (b) spray means in the upper portion of the spray section for spraying the aqueous slurry of phosphate rock;
   (c) a vertical falling film packed section located below the spray section;
   (d) a grate located at the top of the packed section to permit an even distribution of slurry therethrough into the packed section;
   (e) an open grid-type packing in said packed section comprising a plurality of layers of misaligned grids of inert material arranged to provide at least 75% open area and a packing height of at least 9 feet so as to result in 60–90% of the hydrogen chloride being absorbed in the slurry in the packed section, said grids having vertical ribs spaced about 2 inches apart from each other in both directions and the grid layers being vertically spaced from about 1–2 inches from each other, said grid arrangement minimizing any plugging of the slurry;
   (f) means for introducing the hydrogen chloride-containing gas below the bottom portion of the packed section for passage of the gas upward through the packed section and the spray section countercurrent to the downwardly flowing slurry of phosphate rock;
   (g) a base section located below the packed section to provide a reservoir of liquid for additional reaction between the phosphate rock and the hydrogen chloride absorbed in the slurry, in order to form a product slurry wherein about 100% of the $P_2O_5$ in the rock is converted to water-soluble $P_2O_5$;
   (h) means for agitating the product slurry in the base section to maintain the solids in suspension;
   (i) means for recycling part of the product slurry from the base section to the top of the grate located at the top of the packed section to increase the flow of slurry in the packed section; and
   (j) means for controlling the level of slurry in the base section and regulating the flow of product slurry from the apparatus.

2. An apparatus as claimed in claim 1 wherein the recycling means includes a spray nozzle located in the lower part of the spray section to distribute the recycled slurry over the grate.

3. An apparatus for producing phosphoric acid from an aqueous slurry of phosphate rock and a hydrogen chloride-containing gas comprising:
   (a) a vertical spray section having an outlet for spent gas and an inlet for introducing an aqueous slurry of phosphate rock, both located at the top portion of the spray section;
   (b) spray means in the upper portion of the spray section for spraying the aqueous slurry of phosphate rock;
   (c) a vertical falling film packed section, which packed section is separate from the spray section thereby providing two separate columns;
   (d) a grate located at the top portion of the packed section to permit an even distribution of slurry therethrough;
   (e) an open grid-type packing in said packed section comprising a plurality of layers of misaligned grids of inert material arranged to provide at least 75% open area and a packing height of at least 9 feet so as to result in 60–90% of the hydrogen chloride being absorbed in the slurry in the packed section, said grids having vertical ribs spaced about 2 inches apart from each other in both directions and the grid layers being vertically spaced from about 1–2 inches from each other, said grid arrangement minimizing any plugging of the slurry;
   (f) means for introducing the slurry from the bottom portion of the spray section to the top of the grate located in the top portion of the packed section;
   (g) means for introducing the hydrogen chloride-containing gas below the bottom portion of the packed section for passage of the gas upward through the packed section counter current to the downwardly flowing slurry of the phosphate rock;
   (h) means for introducing the gas from the top portion of the packed section into the bottom portion of the spray section;
   (i) a base section located below the packed section to provide a reservoir of liquid for additional reaction between the phosphate rock and the hydrogen chloride absorbed in the slurry, in order to form a product slurry wherein about 100% of the $P_2O_5$ in the rock is converted to water-soluble $P_2O_5$;
   (j) means for agitating the product slurry in the base section to maintain the solids in suspension;
   (k) means for recycling part of the product slurry from the base section to the top of the grate located at the packed section to increase the flow of slurry in the packed section; and
(1) means for controlling the level of slurry in the base section and regulating the flow of product slurry from the apparatus.

References Cited
UNITED STATES PATENTS

| | | | |
|---|---|---|---|
| 1,112,211 | 9/1914 | Hechenbleikner | 23—283 X |
| 1,292,098 | 1/1919 | Seamon | 23—283 X |
| 1,342,024 | 6/1920 | Larison | 23—283 X |
| 1,387,170 | 8/1921 | Poindexter | 23—283 X |
| 1,945,002 | 1/1934 | Shoeld | 23—283 X |
| 3,227,429 | 1/1966 | Renzi | 261—112 |

FOREIGN PATENTS 78,782  7/1962  France.

JOSEPH SCOVRONEK, Primary Examiner

U.S. Cl. X.R.

23—165; 261—112